(12) United States Patent
Suzuki et al.

(10) Patent No.: US 7,227,332 B2
(45) Date of Patent: Jun. 5, 2007

(54) DRIVING CONTROL DEVICE AND METHOD FOR ELECTRIC VEHICLE AND PROGRAM THEREFOR

(75) Inventors: Takehiko Suzuki, Anjo (JP); Yasuo Yamaguchi, Anjo (JP); Satoru Wakuta, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 313 days.

(21) Appl. No.: 10/321,610

(22) Filed: Dec. 18, 2002

(65) Prior Publication Data

US 2003/0137275 A1 Jul. 24, 2003

(30) Foreign Application Priority Data

Dec. 26, 2001 (JP) ............................. 2001-394953

(51) Int. Cl.
  *H02J 7/00* (2006.01)
  *G05B 11/36* (2006.01)
  *B60K 1/00* (2006.01)
(52) U.S. Cl. .................. 320/104; 318/609; 180/65.2
(58) Field of Classification Search ............... 320/104, 320/103, 139, 116, 123, 132, 136, 162; 180/65.1, 180/65.3, 65.6, 65.7, 65.2, 609, 65.5, 165.2; 318/609
See application file for complete search history.

(56) References Cited

U.S. PATENT DOCUMENTS

| | | | | |
|---|---|---|---|---|
| 4,504,881 A * | 3/1985 | Wada et al. | ............... | 361/23 |
| 5,032,993 A * | 7/1991 | Hasegawa et al. | ............. | 701/62 |
| 5,429,090 A * | 7/1995 | Kotchi et al. | ............... | 123/396 |
| 5,982,045 A | 11/1999 | Tabata et al. | | |
| 6,321,525 B1 * | 11/2001 | Rogers | ................... | 60/773 |
| 6,380,641 B2 * | 4/2002 | Matsubara et al. | ...... | 290/40 C |
| 6,382,335 B2 * | 5/2002 | Takashima et al. | ........ | 180/65.2 |
| 6,456,918 B2 * | 9/2002 | Nanri | ................... | 701/51 |
| 6,541,934 B1 * | 4/2003 | Hirschfelder et al. | ..... | 318/609 |
| 6,561,296 B2 * | 5/2003 | Obayashi | ................ | 180/65.2 |
| 6,595,888 B1 * | 7/2003 | Yuasa et al. | ............... | 475/118 |
| 2002/0108794 A1 * | 8/2002 | Wakashiro et al. | ........ | 180/65.2 |

FOREIGN PATENT DOCUMENTS

| | | |
|---|---|---|
| JP | A 10-002241 | 1/1989 |
| JP | A 7-046720 | 2/1995 |
| JP | A 10-150704 | 6/1998 |

* cited by examiner

*Primary Examiner*—Gary L. Laxton
*Assistant Examiner*—Yalkew Fantu
(74) *Attorney, Agent, or Firm*—Oliff & Berridge, PLC

(57) ABSTRACT

A driving control device for an electric vehicle includes an electric machine which is driven by a current supplied from a battery, a transmission which is coupled with the electric machine and performs shifting at a predetermined gear ratio, a charging state detecting portion which detects an electric variable that shows a charging state of the battery, a fail determination processing device which determines whether the electric variable exceeds a threshold value and makes a fail determination when the electric variable exceeds the threshold value, and a charging control processing device which decreases a rotational speed of the electric machine and reduces the electric variable when the fail determination is made. The fail determination is made to decrease the rotational speed of the electric machine when field weakening control becomes unperformable and the electric variable exceeds the threshold value, which makes it possible to prevent an overcurrent from being supplied to the battery.

9 Claims, 9 Drawing Sheets

DRIVING CONTROL DEVICE AND METHOD FOR ELECTRIC VEHICLE AND PROGRAM THEREFOR

The disclosure of Japanese Patent Application No. 2001-394953 filed Dec. 26, 2001 including the specification, drawings and claims is incorporated herein by reference in its entirety.

BACKGROUND OF THE INVENTION

1. Field of Invention

The invention relates to a driving control device for an electric vehicle, a driving control method for an electric vehicle, and a program thereof.

2. Description of Related Art

Conventionally, a driving device for a vehicle is mounted on an electric automobile, as an exemplary electric vehicle, generates torque of a motor as an electric machine, that is, motor torque, and transmits the motor torque to driving wheels. In such a driving device for a vehicle, the motor is driven by a direct current received from a battery at the time of power running (driving), generates the motor torque, receives the torque by inertia of the electric vehicle at the regeneration (power generation) time, generates a direct current, and supplies the current to the battery.

Also, a driving device for a vehicle is mounted on a hybrid vehicle, as an electric vehicle, and transmits a part of engine torque to a power generator (a generator motor) as a first electric machine, and the remaining engine torque to the driving wheels. Such a driving device for a vehicle, including a planetary gear unit which includes a sun gear, a ring gear and a carrier, couples the carrier with the engine, couples the ring gear with the driving wheels, couples the sun gear with the power generator, and transmits rotation which is output from the ring gear and a motor as a second electric machine to the driving wheels to generate a driving force.

A motor control device is arranged in each of the above-mentioned driving devices for the vehicle. In each of the motor control devices, a direct current from the battery is converted into an alternating current by an inverter, and the alternating current is supplied to the motor. Then, the electric vehicle is made to run by driving the motor. In this case, feedback-control by vector control computation is performed on a d-q axis model whose d-axis is in a direction of paired magnetic poles of a rotor of the motor, and q-axis is in a direction at right angles to the d-axis. However, when the motor is driven at a high speed during the feedback-control, an induced voltage rises, which prevents a motor rotational speed from being increased, and narrows a power range of the motor. Accordingly, when the motor is being driven at a high speed, a magnetic flux amount, which is generated from a permanent magnet in a magnetic field that is formed by a d-axial current, is reduced to perform field weakening control.

However, in the conventional driving device for a vehicle, when the field weakening control becomes unperformable for some reason, a high counter electromotive voltage is generated, and an overcurrent is thereby supplied to the battery. As a result, the battery is overcharged. Potential causes include the following: the motor control device becomes incapable of controlling the motor due to a disturbance by noise, physical damage or the like; and the inverter or at least one line among three lines for supplying a current from the inverter to the motor is physically damaged. Generally, because a battery with relatively high voltage, such as 144, 288, 312 V or the like, is used for the electric vehicle or the hybrid vehicle, a current supplied to the battery is low. Therefore, when an overcurrent is about to be supplied to the battery, a relay on a direct current cable for supplying a direct current from the battery to the inverter is opened to prevent the overcurrent from being supplied to the battery.

In contrast to this, for example, in the case of the electric vehicle or the hybrid vehicle in which a battery with a relatively low voltage, such as 42 V or the like, is used, a current supplied to the battery is larger by an increased amount of current with respect to the battery with high voltage. Accordingly, in the case where an overcurrent is about to be supplied to the battery, when the relay on the direct current cable needs to be opened, the relay must be upsized. As a result, not only the driving device for a vehicle is upsized but also an arcing phenomenon occurs, which increases a period of time until the relay is opened.

In addition, even in the case where the field weakening control or the like is properly performed, when the battery and the inverter are electrically insulated because the direct current cable is broken, a connection terminal of the direct current cable is detached or the like, a voltage drop by an amount of internal resistance of the battery ceases, and an excessively high voltage is applied to the inverter.

Also, when a power transmission line for supplying power to auxiliaries of the electric vehicle, such as an electrical component, branches off from the direct current cable, and is connected to the electrical component, an excessively high voltage is applied to the electrical component.

SUMMARY OF THE INVENTION

In order to solve the problem of the above-mentioned conventional driving device for a vehicle, it is an object of the invention to provide a driving control device for an electric vehicle capable of preventing a battery from being overcharged or an excessively high voltage from being applied to an inverter, a driving control method for an electric vehicle and a program thereof.

Accordingly, a driving control device for an electric vehicle according to the invention includes an electric machine which is driven by a current supplied from a battery, a transmission which is drivingly coupled with the electric machine and performs shifting at a predetermined gear ratio, a charging state detecting portion which detects an electric variable that shows a charging state of the battery, a fail determination processing device that determines whether the electric variable exceeds a threshold value and makes a fail determination when the electric variable exceeds the threshold value, and charging control processing device that decreases a rotational speed of the electric machine and reduces the electric variable when the fail determination is made.

In this case, the fail determination is made when a field weakening control cannot be performed and the electric variable shows the charging state of the battery exceeds the threshold value, and the rotational speed of the electric machine is decreased, which prevents an overcurrent from being supplied to the battery, and the battery from being overcharged.

Also, it is not necessary to upsize a relay on a direct current cable, which not only enables downsizing of the driving device for a vehicle but also prevents an arcing phenomenon from occurring. Accordingly, a period of time until the relay is opened can be reduced.

In addition, in the case where the electric variable which shows the charging state of the battery exceeds the threshold value because the direct current cable for supplying a direct current from the battery to the inverter is broken, the direct current cable is detached or the like when the field weakening control is being performed properly, the fail determination is made and the rotational speed of the electric machine is decreased, which prevents an excessively high voltage from being applied to the inverter.

Furthermore, when a power transmission line for supplying power to auxiliaries of the electric vehicle, such as an electrical component, branches off from the direct current cable and is connected to the electrical component, an excessively high voltage can be prevented from being applied to the electrical component.

A driving control method for an electric vehicle is applied to an electric vehicle including an electric machine, which is driven by a current supplied from the battery, and a transmission, which performs shifting at a predetermined gear ratio.

Then, in the method, an electric variable which shows a charging state of the battery is detected, whether the electric variable exceeds a threshold value is determined, a fail determination is made when the electric variable exceeds the threshold value, and a rotational speed of the electric machine is decreased and the electric variable is reduced when the fail determination is made.

A program of the driving control method for an electric vehicle according to the invention is applied to a driving control method for an electric vehicle including an electric machine which is driven by a current supplied from a battery, and a transmission which is coupled with the electric machine and performs shifting at a predetermined gear ratio.

Then, a computer is made to function as a charging state detecting portion which detects an electric variable that shows a charging state of the battery, fail determination processing routine that determines whether the electric variable exceeds a threshold value and makes a fail determination when the electric variable exceeds the threshold value, and charging control processing routine that decreases a rotational speed of the electric machine and reduces the electric variable when the fail determination is made.

For the purposes of this disclosure, device and means may be considered synonyms. Both relate to a computer and its programs and encompass any necessary memory. The device may be implemented solely by circuitry, i.e. hardware, or a combination of hardware and software. Further, in some cases, as defined in the specification, the device/means may include other elements.

BRIEF DESCRIPTION OF THE DRAWINGS

The invention will be described with reference to the drawings, in which.

DETAILED DESCRIPTION OF PREFERRED EMBODIMENTS

Hereafter, embodiments of the invention will be explained in detail with reference to accompanying drawings. Note that a driving control device for a hybrid vehicle as a driving control device for an electric vehicle will be explained.

Figure 1:
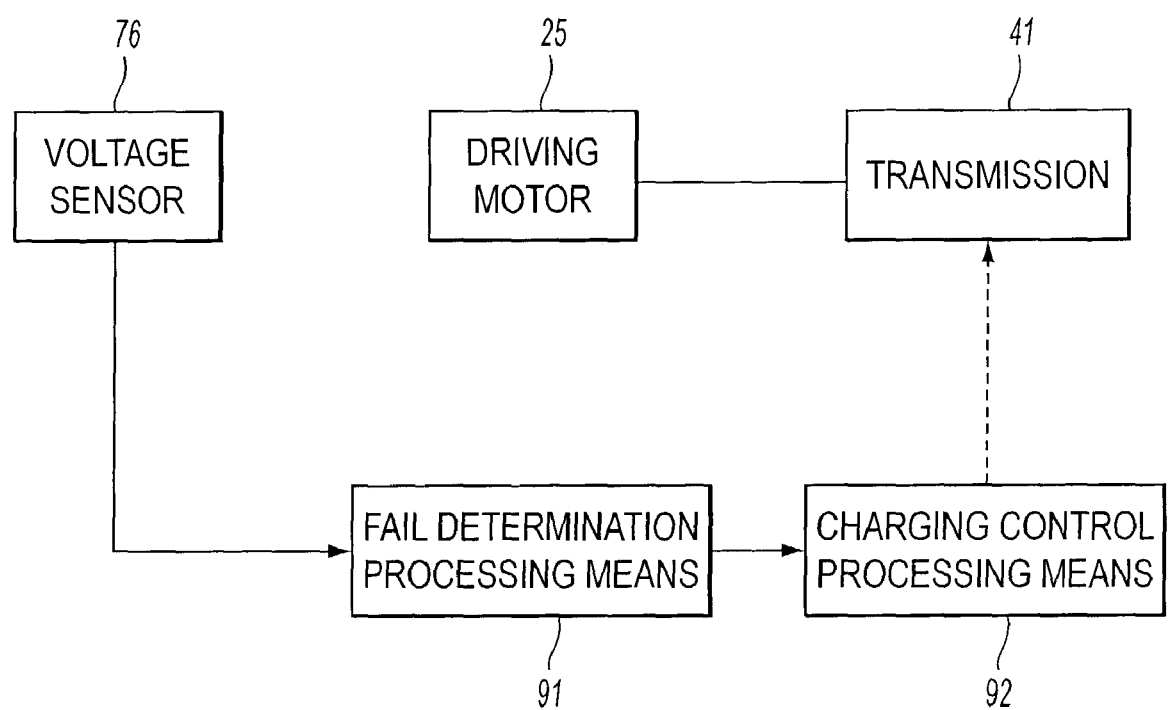
FIG. 1 is a function block diagram of a driving control device for a hybrid vehicle according to a first embodiment of the invention.

FIG. 1 is a function block diagram of a driving control device for a hybrid vehicle according to a first embodiment of the invention. In the figure, reference numeral 25 denotes a motor as an electric machine which is driven by a current supplied from a battery (not shown), reference numeral 41 denotes a transmission which is coupled with the motor 25 and performs shifting at a predetermined gear ratio, reference numeral 76 denotes a voltage sensor which functions as charging state detecting means for detecting an electric variable that shows a charging state of the battery, reference numeral 91 denotes fail determination processing means which determines whether the electric variable exceeds a threshold value and makes a fail determination when the electric variable exceeds the threshold value, and reference numeral 92 denotes charging control processing means which decreases a rotational speed of the motor 25 and reduces the electric variable when the fail determination is made.

Next, a driving device for a vehicle for driving a hybrid vehicle as an electric vehicle will be explained. Note that the invention can be applied to a driving device for a vehicle which drives an electric automobile that is provided with a motor and without an engine, a hybrid vehicle that is provided with an engine, a power generator and a motor, or the like, in place of a hybrid vehicle that is provided with an engine and a motor, as the electric vehicle.

Figure 2:
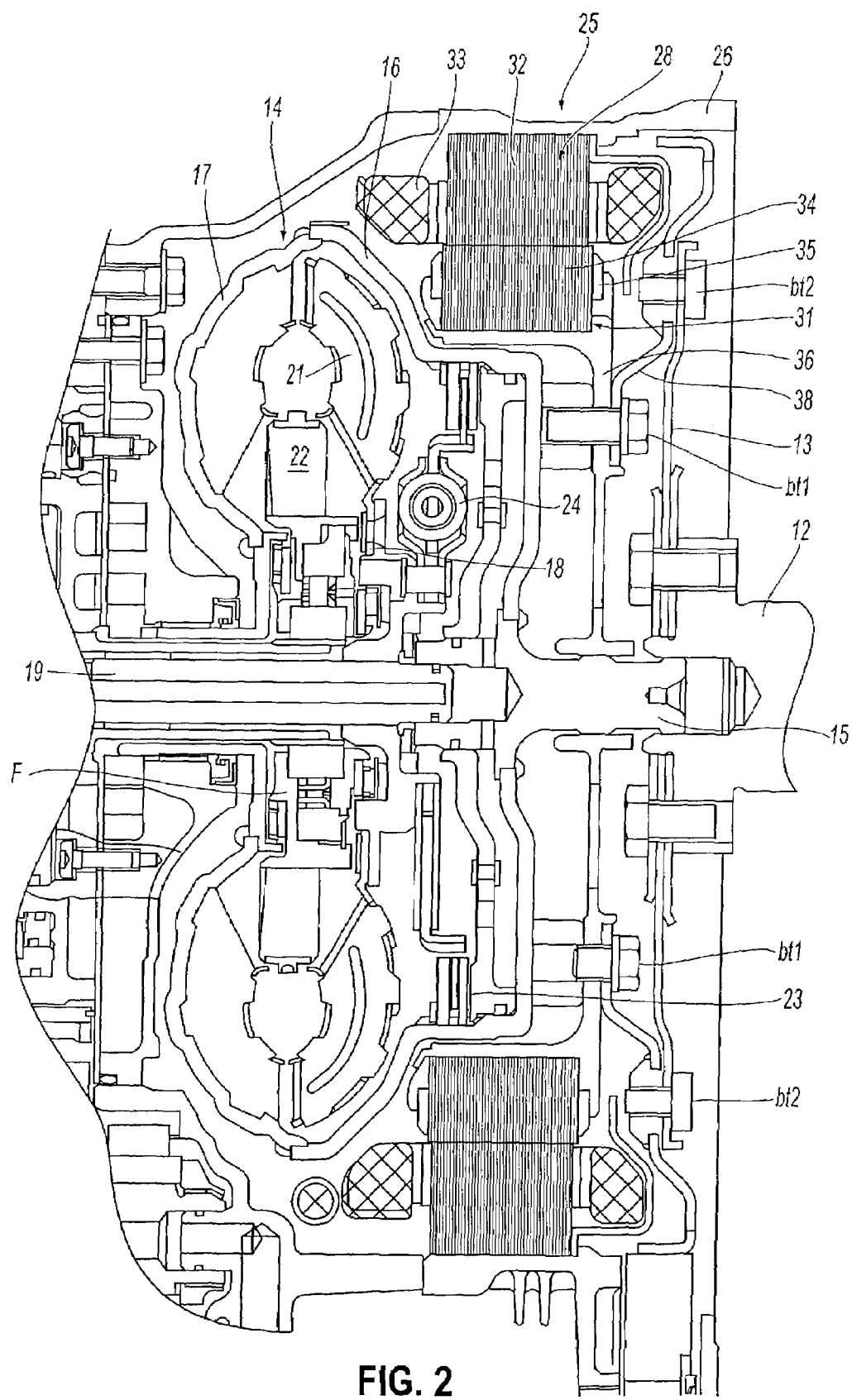
FIG. 2 is a schematic diagram showing main portions of the driving device for a vehicle according to the first embodiment of the invention.

FIG. 2 is a schematic diagram showing the main portions of the driving device for a vehicle according to the first embodiment of the invention. In the figure, reference numeral 12 denotes a crank shaft which is coupled with an engine (not shown), reference numeral 13 denotes a drive plate, reference numeral 14 denotes a torque converter as a hydraulic power transmission, reference numeral 25 denotes the motor as the electric machine, and reference numeral 15 denotes a center piece of the torque converter 14. The torque converter 14 includes the center piece 15, a front cover 16 which is coupled with the center piece 15, a pump impeller 17 which is coupled with the front cover 16, a turbine runner 21 which is arranged opposed to the pump impeller 17 so as to form a torus along with the pump impeller 17, and to be coupled with an input shaft 19 of the transmission through a turbine hub 18, a stator 22, a lock-up clutch device 23 which is detachably arranged, and a damper device 24 which absorbs a fluctuation of torque which is transmitted through the torque converter 14, that is, the transmitted torque.

In the torque converter 14, the rotation transmitted from the engine is transmitted to the front cover 16 through the crank shaft 12 and the center piece 15, and then transmitted to the pump impeller 17 which is fixed to the front cover 16. In this case, when the pump impeller 17 rotates, oil in the torus flows along a periphery of a shaft of the torque converter 14, circulates through the pump impeller 17, the turbine runner 21 and the stator 22 by a centrifugal force, rotates the turbine runner 21 and the rotation is transmitted to the input shaft 19.

Then, for example, at the starting time of the hybrid vehicle, when the pump impeller 17 has just started rotating and a difference in rotational speeds between the pump impeller 17 and the turbine runner 21 is large, the oil flowing out of the turbine runner 21 flows in a direction of interfering with the rotation of the pump impeller 17. Accordingly, the stator 22 is arranged between the pump impeller 17 and the turbine runner 21, and the stator 22 changes the flow of oil into a direction of supporting the rotation of the pump impeller 17 when the difference in rotational speed between the pump impeller 17 and the turbine runner 21 is large.

Then, when the rotational speed of the turbine runner 21 increases and the difference in the rotational speeds between the pump impeller 17 and the turbine runner 21 becomes smaller, the oil which was hitting a front side of a blade of the stator 22 starts hitting a back side thereof, which interferes with the flow of oil. Accordingly, a one-way clutch F is arranged on an inner periphery side of the stator 22 in order to make the stator 22 rotatable only in a predetermined direction. Therefore, when the oil starts hitting the back side of the blade, the stator 22 is spontaneously rotated in a predetermined direction by the one-way clutch F. As a result, the oil circulates smoothly.

After the hybrid vehicle starts running and a predetermined vehicle speed is obtained, the lock-up clutch device 23 is engaged and the rotation of the engine is directly transmitted to the input shaft 19 without being transmitted through the oil.

The motor 25 includes a stator 28 which is fixed to a case 26 of the driving device for a vehicle, and a rotor 31 which is centered with respect to the center piece 15 and is rotatably arranged. The stator 28 includes a stator core 32, and a coil 33 which is wound around the stator core 32. The rotor 31 includes a rotor core 34, and permanent magnets 35 which are arranged at a plurality of positions in a circumferential direction of the rotor core 34.

The rotor 31 is centered with respect to the center piece 15 through a rotor hub 36. The rotor hub 36 is coupled with the front cover 16 with a bolt bt1 as well as being coupled with the drive plate 13 through a ring plate 38 and a bolt bt2.

Figure 3:
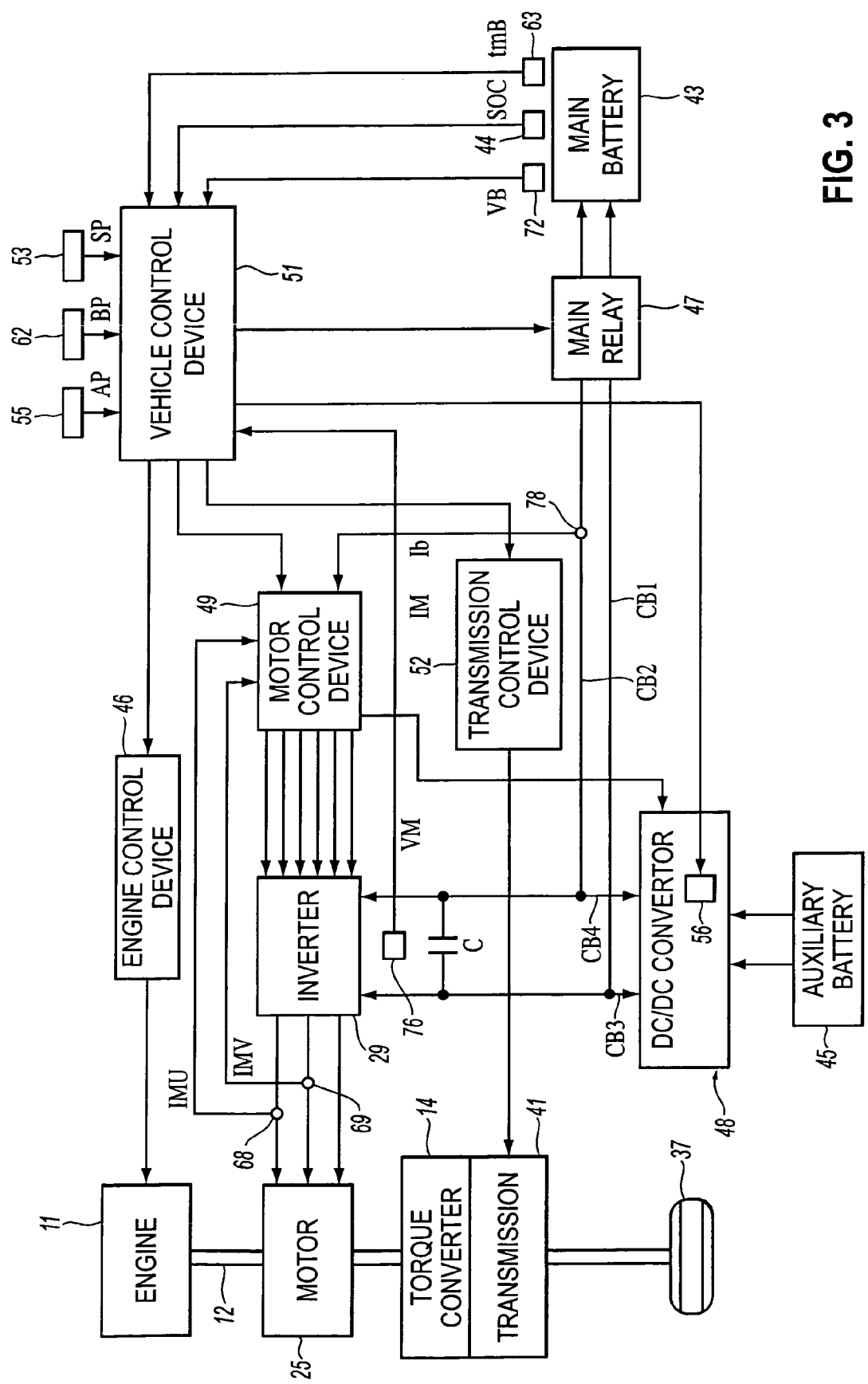
FIG. 3 is a schematic diagram of the driving control device for a hybrid vehicle according to the first embodiment of the invention.

FIG. 3 is a schematic diagram of the driving control device for a hybrid vehicle according to the first embodiment of the invention. In the figure, reference numeral 11 denotes an engine, reference numeral 12 denotes the crank shaft, reference numeral 14 denotes the torque converter, reference numeral 25 denotes the motor, reference numeral 29 denotes an inverter as a motor inverter for driving the motor 25, reference numeral 37 denotes a driving wheel, reference numeral 41 denotes the transmission which is coupled with the motor 25 and the engine 11 through the torque converter 14 and performs shifting of the rotation that is output from the torque converter 14 at a predetermined gear ratio, reference numeral 43 denotes a main battery, as a first battery, which is a power supply for driving the hybrid vehicle, and reference numeral 45 denotes an auxiliary battery, as a second battery, which is a power supply for operating auxiliaries of the hybrid vehicle. The inverter 29 is connected to the battery 43 through a main relay 47 as a relay and direct current cables CB1, CB2 to be supplied a direct current from the main battery 43. Also, the main battery 43 is connected to a DC/DC converter 48 through the main relay 47, the direct current cables CB1, CB2, and direct current cables CB3, CB4 which branch from the direct current cables CB1, CB2. Accordingly, the DC/DC converter 48 and the auxiliary battery 45 are connected.

According to the embodiment, a voltage, as a first power supply voltage, in the main battery 43 is 42 V, and a voltage, as a second power supply voltage, in the auxiliary battery 45 is 12 V. The DC/DC converter 48 converts a voltage of 42 V into a voltage of 12 V, or a voltage of 12 V into a voltage of 42 V. Also, a switch 56 is arranged in the DC/DC converter 48. The DC/DC converter 48 can be activated or stopped by turning the switch 56 ON/OFF.

The voltage sensor 76, as a direct-current voltage detecting portion, is arranged at an entrance side of the inverter 29 in order to detect a direct current which is applied to the inverter 29, that is, a motor inverter voltage VM as an inverter voltage. A current sensor 78, as a direct current detecting portion is arranged at a predetermined position of the direct current cable CB2 in order to detect a direct current which is applied to the inverter 29, that is, a motor inverter current IM, and to detect a direct current supplied to the main battery 43 at the regeneration time, that is, a battery current Ib. Thus, the motor inverter voltage VM is transmitted to a control device 51 for a vehicle, and the motor inverter current IM and the battery current Ib are transmitted to a motor control device 49. A smoothing capacitor C is connected between the main battery 43 and the inverter 29. Note that the motor inverter voltage VM, the motor inverter current IM, the battery current Ib and the like are electric variables which show a charging state of the main battery 43. A charging state detecting portion is formed by the voltage sensor 76, the current sensor 78 and the like.

Also, the control device 51 for a vehicle includes a CPU, and a recording device and the like which are not shown, to control the entire driving device for a vehicle, and functions as a computer based on predetermined programs, data and the like. The control device 51 for a vehicle is connected to an engine control device 46, the motor control device 49, and an automatic transmission control device 52. The engine control device 46 includes a CPU, a recording device and the like which are not shown, and transmits instruction signals, such as a throttle opening θ, valve timing and the like to the engine 11 in order to control the engine 11. The motor control device 49 includes a CPU, a recording device and the like which are not shown, transmits a drive signal to the inverter 29 in order to control the motor 25. The automatic transmission control device 52 includes a CPU, a recording device and the like which are not shown, and transmits various signals, such as a solenoid signal to the transmission 41 to control the automatic transmission. The solenoid signal is generated for each shift speed. When a solenoid signal corresponding to a predetermined shift speed is transmitted to the transmission 41, the shift speed is determined in the transmission 41 and shifting is performed at a gear ratio corresponding to the shift speed.

A first control device is formed by the engine control device 46, the motor control device 49 and the automatic transmission control device 52. A second control device, which is positioned above the first control device, is formed by the control device 51 for a vehicle. Also, the engine control device 46, the motor control device 49, and the automatic transmission control device 52, as well as the control device 51, for a vehicle function as a computer based on predetermined programs, data and the like.

The inverter 29 is driven in accordance with the drive signal, receives a direct current from the main battery 43 at the time of power running to generate currents IMU, IMV, IMW for each phase, supplies the currents IMU, IMV, IMW for each phase to the motor 25, Further, at the regeneration time, the inverter 29 receives the currents IMU, IMV, IMW for each phase from the motor 25 to generate a direct current, and supplies the direct current to the main battery 43.

Also, reference numeral 44 denotes a remaining battery capacity detecting device which detects a state of the main battery 43, that is, remaining battery capacity SOC as a battery state, reference numeral 53 denotes a shift position sensor which detects a position of a shift lever (not shown) as a shifting operation portion, that is, a shift position SP, reference numeral 55 denotes an accelerator switch as an engine load detecting portion and an accelerator operation detecting portion which detects a position of an accelerator pedal (not shown) (an accelerator pedal depressing amount), that is, an accelerator pedal position AP, reference numeral 62 denotes a brake switch as a brake operation detecting portion which detects a position of a brake pedal (not shown) (a brake pedal depressing amount), that is, a brake pedal position BP, and reference numeral 63 denotes a battery temperature sensor as a temperature detecting portion which detects a temperature tmB of the main battery 43. The remaining battery capacity SOC and the temperature tmB are transmitted to the control device 51 for a vehicle. Note that a load placed on the engine 11, that is, an engine load is shown by the accelerator pedal position AP.

Reference numerals 68, 69 are current sensors as direct current detecting portions which detect the currents IMU, IMV for each phase, and reference numeral 72 denotes a battery voltage sensor as a voltage detecting portion for the main battery 43 which detects a battery voltage VB as the battery state. The battery voltage VB is transmitted to the control device 51 for a vehicle. Also, a battery current, a battery temperature or the like can be detected as the battery state. The battery state detecting portion is formed by the remaining battery capacity detecting device 44, the battery voltage sensor 72, the battery temperature sensor 63, the battery current sensor (not shown), and the like. The currents IMU, IMV are transmitted to the motor control device 49 and the control device 51 for a vehicle. Note that the battery voltage VB is an electric variable which shows the charging state of the main battery 43, and the charging state detecting portion is formed by the battery voltage sensor 72.

The control device 51 for a vehicle transmits an engine control signal to the engine control device 46 to drive or stop the engine 11 using the engine control device 46. Also, vehicle speed calculation processing means (not shown) of the control device 51 for a vehicle performs a vehicle speed calculation processing by reading a position of the rotor 31 (FIG. 2) of the motor 25, that is, a rotor position, calculating a rate of change of the rotor position, and calculating a vehicle speed V based on the rate of change and a gear ratio in a torque transmission system from the center piece 15 to the sheering wheel 37.

Then, the control device 51 for a vehicle sets a rotational speed of the engine 11, that is, a target engine speed NE which shows a target value of the engine speed NE, and a target motor torque TM which shows a target value of the motor torque TM, and transmits the target engine speed NE to the engine control device 46, and the target motor torque TM to the motor control device 49. According to the embodiment, the motor 25 is used as a starter for activating the engine 11 or as a power generator. In addition to this, the motor 25 may be used as an auxiliary driving source when the throttle opening θ of the engine 11 changes, and the engine torque TE fluctuates.

Next, operation of the motor control device 49 will be explained. In this case, the motor control device 49 performs feedback-control by vector control computation on a d-q axis model whose d-axis is in a direction of paired magnetic poles of a rotor 31, and q-axis is in a direction at right angles to the d-axis.

First, motor rotational speed calculation processing means (not shown) as electric machine rotational speed calculation processing means of the motor control device 49 performs motor rotational speed calculation processing, reads the rotor position, and calculates the rate of change of the rotor position in order to calculate the rotational speed of the motor 25, that is, a motor rotational speed NM.

Next, motor control processing means (not shown) of the motor control device 49 performs motor control processing, reads the target motor torque TM* and the battery voltage VB, and calculates a d-axis current command value IMd* and a q-axis current command value IMq* based on the motor rotational speed NM, the target motor torque TM* and the battery voltage VB with reference to a current command map for controlling the motor, which is recorded on the recording device of the motor control device 49.

Also, the motor control processing means reads the currents IMU, IMV from the current sensors 68, 69, and calculates the current IMW based on the currents IMU, IMV.

$$IMW = IMU - IMV$$

Note that the current IMW as well as the currents IMU, IMV may be detected by the current sensor.

Next, alternating current calculation processing means (not shown) of the motor control processing means performs alternating current calculation processing, and calculates a d-axis current IMd and a q-axis current IMq which are alternating currents. For that purpose, the alternating current calculation processing means performs a three-phase/two-phase conversion to convert the currents IMU, IMV, IMW into the d-axis current IMd and the q-axis current IMq. Then, alternating voltage command value calculation processing means (not shown) of the motor control processing means performs alternating voltage command value calculation processing, and calculates voltage command values VMd*, VMq* based on the d-axis current IMd and the q-axis current IMq, and the d-axis current command value IMd* and the q-axis current command value IMq*. Also, the motor control processing means performs a two-phase/three-phase conversion to convert the voltage command values VMd*, VMq* into the voltage command values VMU*, VMV*, VMW*, calculates pulse width modulation signals SU, SV, SW based on the voltage command values VMU*, VMV*, VMW*, and outputs the pulse width modulation signals SU, SV, SW to drive processing means (not shown) of the motor control device 49. The drive processing means performs drive processing, and transmits the drive signal to the inverter 29 based on the pulse width modulation signals SU, SV, SW. In this way, the feedback-control is performed.

Meanwhile, when the motor 25 is driven at a high speed, an induced voltage rises, which prevents the motor torque TM from being generated adequately. Accordingly, field weakening control processing means (not shown) of the motor control device 49 performs field weakening control processing, for example, by reducing the d-axis current command value IMd* and decreasing an amount of magnetic flux of the magnetic field system which is formed by the d-axis current IMd, when the motor 15 is being driven at a high speed.

However, when the field weakening control becomes unperformable for some reason, a high counter electromotive voltage E0 is generated, and an overcurrent is supplied to the main battery 43. As a result, the battery 43 is overcharged. Potential causes thereof include: the motor control device 49 becomes incapable of controlling the motor due to a disturbance by noise, physical damage or the like, and the inverter 29 and at least one line, among the three lines for supplying currents IMU, IMV, IMW, from the inverter 29 to the motor 25 is physically damaged. Generally, because a battery with relatively high voltage, such as 144, 288, 312 V or the like, is used for the electric vehicle or the hybrid vehicle, a current supplied to the battery is small. Therefore, when an overcurrent is about to be supplied to the main battery, a relay on a direct current cable is opened to prevent the overcurrent from being supplied to the battery.

In contrast to this, as shown in the embodiment, in the case of a hybrid vehicle (an electric vehicle) in which the main battery 43 with a relatively low voltage, such as 42 V or the like, is used, a current supplied to the main battery 43 is larger by an increased amount of current with respect to the battery with high voltage. Accordingly, in the case where an overcurrent is about to be supplied to the main battery 43, when the main relay 47 on the direct current cables CB1, CB2 needs to be opened, the main relay 47 must be upsized. As a result, not only the control device is upsized but also an arcing phenomenon occurs, which increases a period of time until the main relay 47 is opened. Consequently, an overcurrent is supplied to the main battery 43, and the main battery 43 is overcharged.

Therefore, when it is assumed that the main battery 43 is overcharged, up-shifting is performed in the automatic transmission to decrease the engine speed NE, and reduce the battery voltage Ib which is generated by the motor 25 at the regeneration time and supplied to the main battery 43, based on a determination that a failure has occurred in the driving device for a vehicle.

Figure 4:
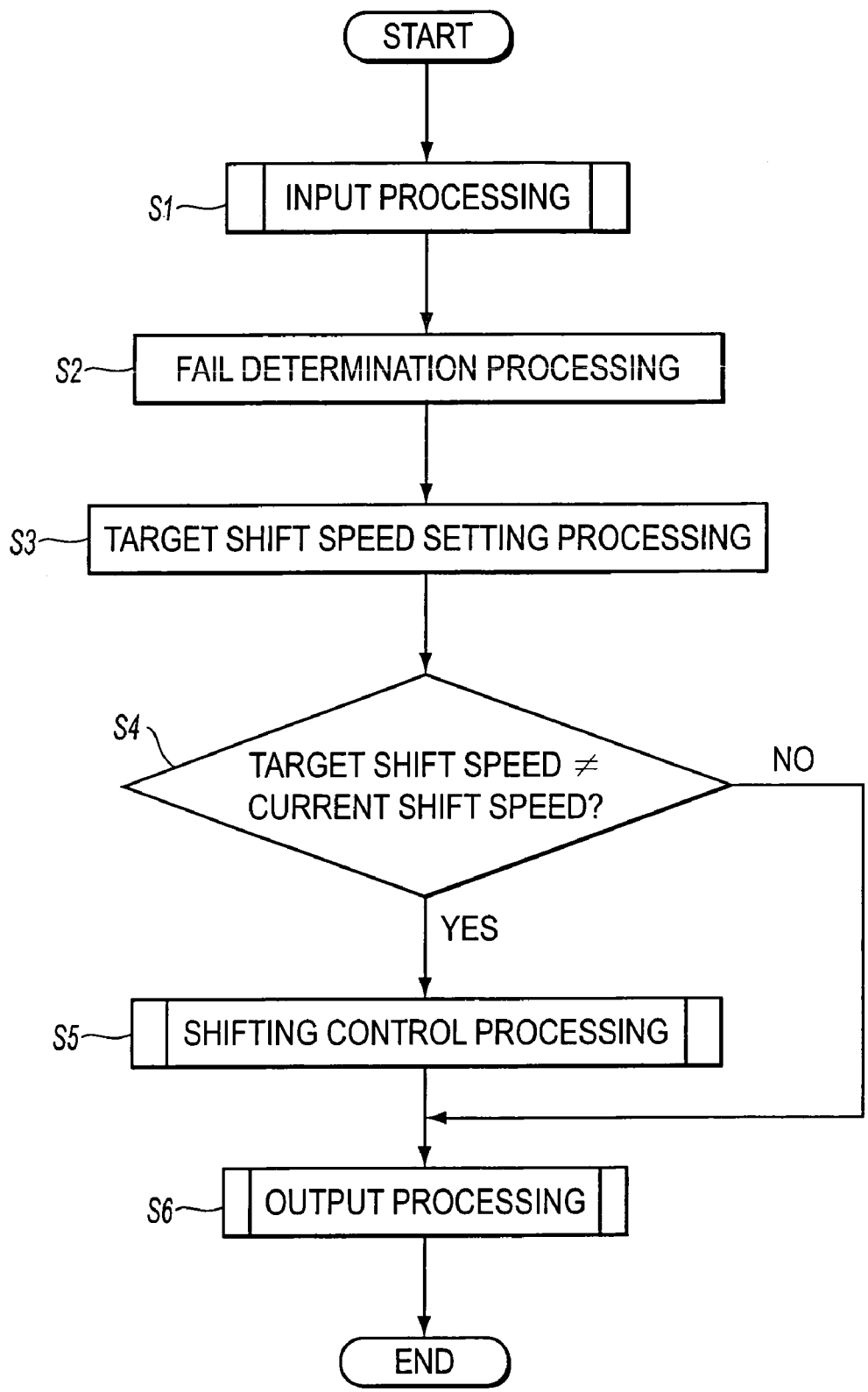
FIG. 4 is a main flowchart showing operations of the driving control device for a hybrid vehicle according to the first embodiment of the invention.
Figure 5:
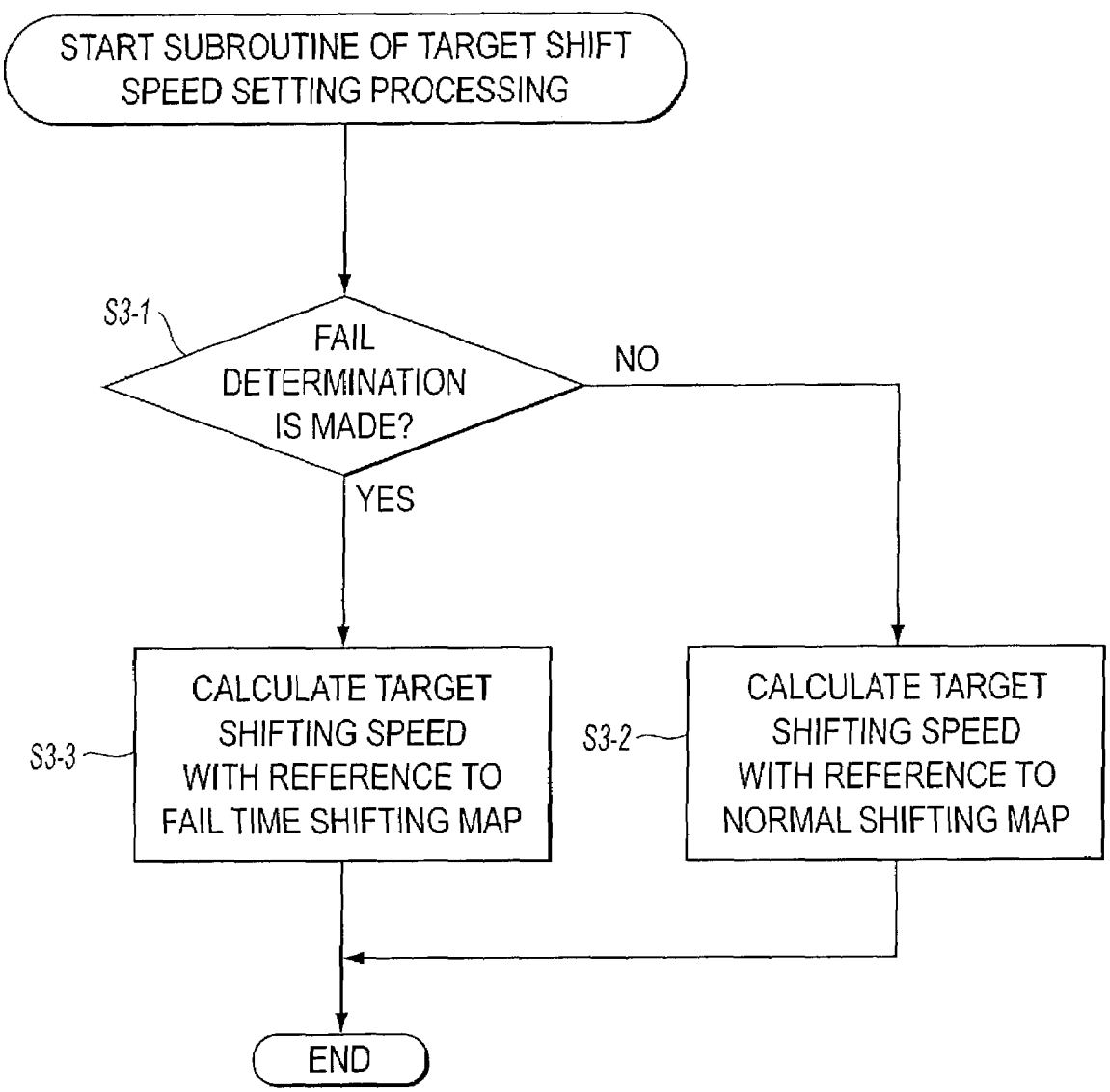
FIG. 5 is a flowchart showing a subroutine for a target shift speed setting processing according to the first embodiment of the invention.
Figure 6:
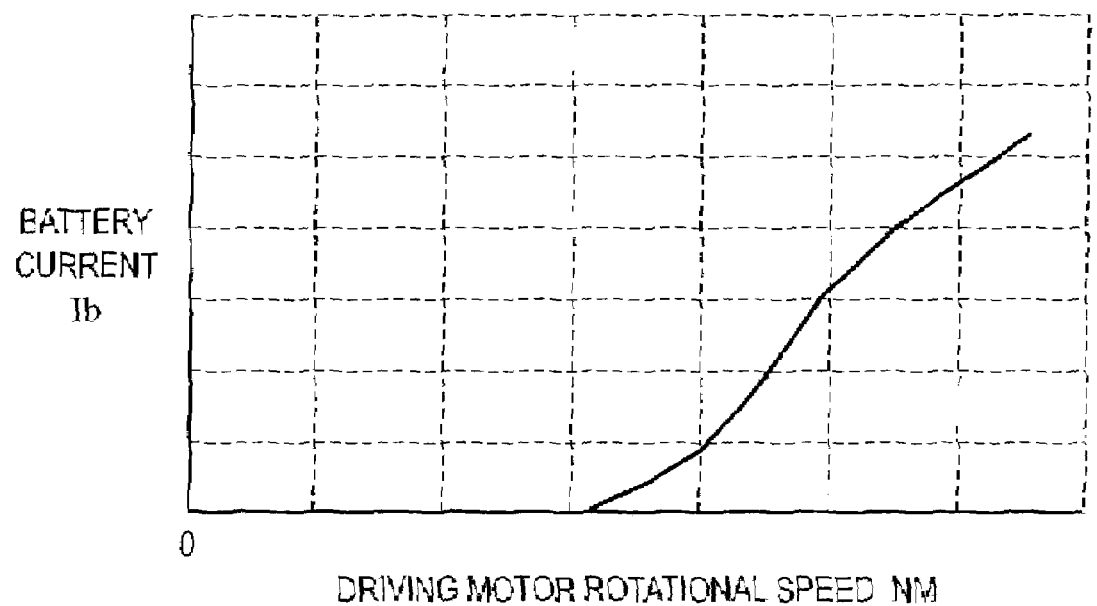
FIG. 6 is a diagram showing the relationship between a motor rotational speed and a battery current according to the first embodiment of the invention.
Figure 7:
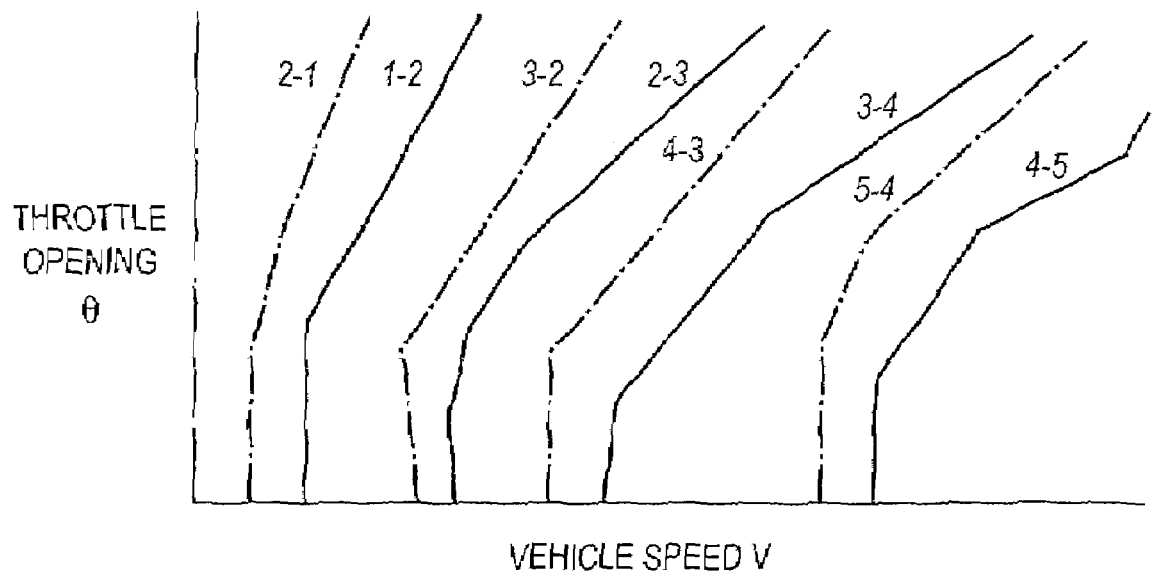
FIG. 7 is a diagram showing a normal shifting map according to the first embodiment of the invention.
Figure 8:
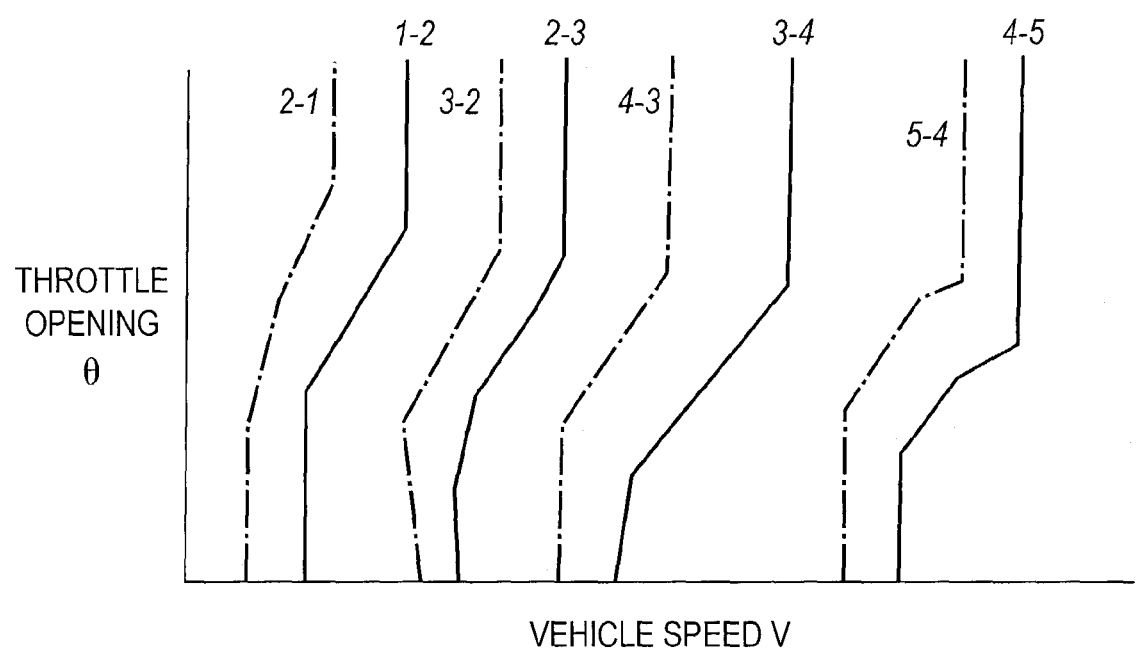
FIG. 8 is a diagram showing a shifting map at the fail time according to the first embodiment of the invention.
Figure 9:
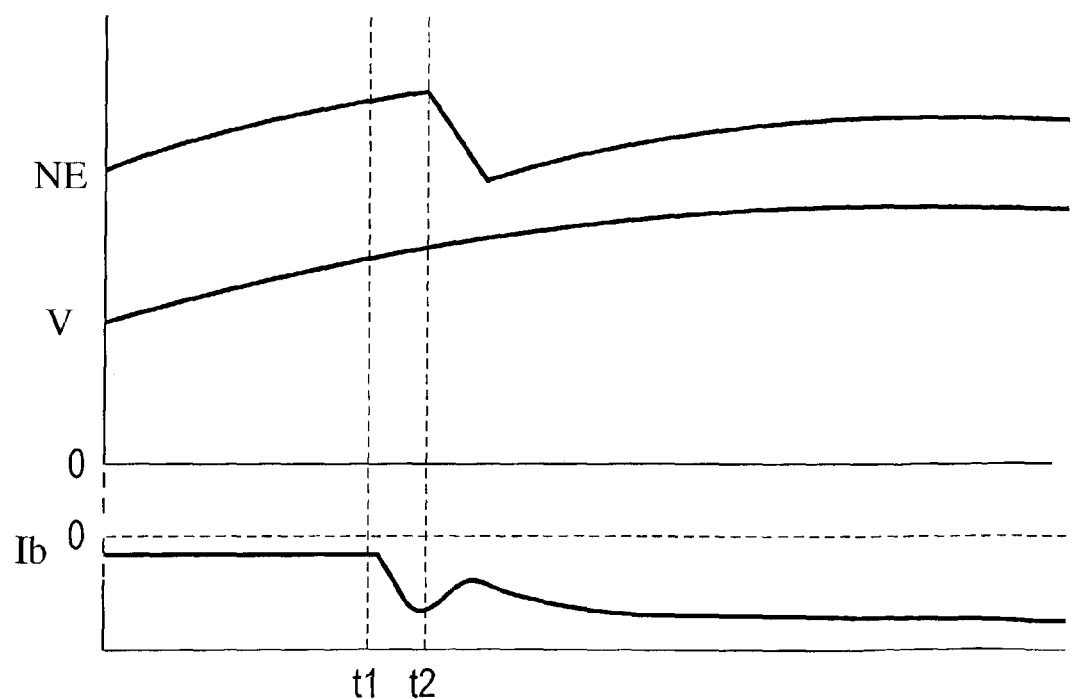
FIG. 9 is a time chart showing the operations of the driving control device for a hybrid vehicle according to the first embodiment of the invention.

FIG. 4 is a main flow chart showing an operation of the driving control device for a hybrid vehicle according to the first embodiment of the invention, FIG. 5 is a diagram showing a subroutine for target shift speed setting processing according to the first embodiment of the invention, FIG. 6 is a diagram showing the relationship between a motor rotational speed and a battery current according to the first embodiment of the invention, FIG. 7 is a diagram showing a normal shifting map according to the first embodiment of the invention, FIG. 8 is a diagram showing a fail-time shifting map according to the first embodiment of the invention, and FIG. 9 is a time chart showing the operation of the driving control device for a hybrid vehicle according to the first embodiment of the invention. Note that a horizontal axis shows the motor rotational speed NM and a vertical axis shows the battery current Ib in FIG. 6, and a horizontal axis shows the vehicle speed V and a vertical axis shows the throttle opening $\theta$ in FIGS. 7 and 8.

Input processing means (not shown) of the control device 51 for a vehicle (FIG. 3) performs input processing by reading a solenoid signal which is generated in the automatic transmission control device 52, the vehicle speed V which is calculated by the vehicle speed calculation processing means, the throttle opening $\theta$ which is generated by the engine control device 46, the shift position SP which is detected by the shift position sensor 53, the motor inverter voltage VM which is detected by the voltage sensor 76, and the like.

A running condition for the hybrid vehicle is expressed by the vehicle speed V, and the engine load as well as the accelerator pedal position AP is expressed by the throttle opening $\theta$. Also, it is possible to detect the throttle opening $\theta$ by a throttle opening sensor (not shown), and read the throttle opening $\theta$ detected by the throttle opening sensor.

Then, a charging voltage is expressed by the motor inverter voltage VM. Note that it is also possible to read the battery voltage VB which is detected by the battery voltage sensor 72 or the battery current Ib which is detected by the current sensor 78, instead of the motor inverter voltage VM, as an electric variable which shows the charging state of the main battery 43.

Next, the fail determination processing means 91 (FIG. 1) of the control device 51 for a vehicle performs fail determination processing to determine whether a failure has occurred in the driving device for a vehicle.

Namely, the fail determination processing means 91 determines whether the motor inverter voltage VM exceeds a threshold value VMth, determines that a failure has occurred when the motor inverter voltage VM exceeds the threshold value VMth, and makes the fail determination. When the motor inverter voltage VM is equal to or lower than the threshold value VMth, the fail determination processing means 91 does not make the fail determination.

Next, target shift speed setting processing means (not shown) of the control device 51 for a vehicle performs target shift speed setting processing to calculate and set a target shift speed. For that purpose, the target shift speed setting processing means reads a result determined by the fail determination processing means 91, and determines whether the fail determination is made. Then, the target shift speed setting processing means reads the vehicle speed V and the throttle opening $\theta$ from the control device 51 for a vehicle, and calculates the target shift speed.

Meanwhile, a normal shifting map, as a first shifting map as shown in FIG. 7, and a fail time shifting map, as a second shifting map as shown in FIG. 8, are recorded in the recording device of the automatic transmission control device 52. In FIGS. 7 and 8, solid lines show shifting lines when up-shifting is performed, and dashed lines show shifting lines when down-shifting is performed. Numerals 1-2, 2-3, 3-4, 4-5 assigned to each shifting line denote up-shifting of a 1-2 shift, a 2-3 shift, a 3-4 shift, and a 4-5 shift respectively. Numerals 2-1, 3-2, 4-3, 5-4 denote down-shifting of a 2-1 shift, a 3-2 shift, a 4-3 shift, and a 5-4 shift respectively. As shown in the figures, the vehicle speeds V at which shifting is performed increase with increases in the throttle opening $\theta$ in the normal shifting map. In contrast to this, in the fail time shifting map, the vehicle speeds V at which shifting is performed are made to be lower than those in the normal shifting map, and also to be constant in a high throttle opening area in which the throttle opening $\theta$ exceeds the threshold values that are set for each shift line.

Thus, the charging control processing means 92 of the target shift speed setting processing means calculates the target shift speed with reference to the fail time shifting map when the fail determination is made. Alternatively, when the fail determination is not made, the charging control processing means 92 of the target shift speed setting processing means calculates the target shift speed with reference to the normal shifting map. At this time, in the fail time shifting map, because shifting is performed at a vehicle speed V which is lower than that in the normal shifting map in the high throttle opening area, the shift speed is higher than that in the normal shifting map when the fail time shifting map is referred to.

Next, comparison processing means (not shown) of the control device 51 for a vehicle performs comparison processing by comparing a targeted shift speed, that is, compares the target shift speed with a shift speed which is currently established in the transmission 41, that is, a current shift speed, based on a solenoid signal, and determines whether the target shift speed and the current shift speed are different, i.e., not equal.

When the target shift speed is different from the current shift speed, shifting control processing means (not shown) of the automatic transmission control device 52 performs a shifting control processing to achieve the target shift speed.

Next, output processing means (not shown) of the automatic transmission control device 52 performs output processing, and transmits a solenoid signal corresponding to the determined target shift speed to the transmission 41.

In the driving control device for a hybrid vehicle having the above-mentioned structure, as shown in FIG. 9, for example, when the accelerator pedal is depressed, the vehicle speed V increases with an increase in the engine speed NE. In accordance with this, the motor rotational speed NM of the motor 25 coupled integrally with the engine 11 increases. Then, when the motor rotational speed NM exceeds the threshold value NMth, the field weakening control is performed. When it becomes impossible to perform the field weakening control at timing t1, the battery current Ib increases, the motor inverter voltage VM exceeds the threshold value VMth, and the fail determination is made. Also, the target shift speed is calculated with reference to the fail time shifting map, and the target shift speed is increased.

In accordance with this, when up-shifting is performed at timing t2, the engine speed NE decreases, and the motor rotational speed decreases as well. Accordingly, the battery current Ib is decreased.

When it becomes impossible to perform the field weakening control and the motor inverter voltage VM exceeds the threshold value VMth, the target shift speed is increased so as to decrease the gear ratio, the engine speed NE is decreased, and the motor rotational speed is decreased. Accordingly, an overcurrent is prevented from being supplied to the main battery 43, and the main battery 43 is prevented from being overcharged.

In addition, it is not necessary to upsize the main relay 47 on the direct current cables CB1, CB2. Therefore, not only the driving device for a vehicle can be downsized but also the arcing phenomenon can be prevented from occurring. Accordingly, a period of time required until the main relay 47 is opened can be reduced.

In a case where the field weakening control is being performed properly, when the main battery 43 and the inverter 29 are electrically intercepted because the direct current cables CB1, CB2 are broken or connection terminals of the direct current cables CB1, CB2 are detached or the like, a voltage drop by an amount of internal resistance in the main battery 43 ceases. In this case, when the motor inverter voltage VM exceeds the threshold value VMth, the target shift speed is increased and the gear ratio is decreased as well. Therefore, because the engine speed NE is decreased and the motor rotational speed NM is decreased, an excessively high voltage is prevented from being applied to the inverter 29.

In addition, when a power transmission line for supplying power to auxiliaries of the hybrid vehicle, such as an electrical component (not shown), branches off from the direct current cables CB1, CB2 and is connected to the electrical component, an excessively high voltage can be prevented from being applied to the electrical component.

Note that a relationship between the motor rotational speed NM and the battery current Ib is as shown in FIG. 6. In an area in which the motor rotational speed NM exceeds 3200 rpm, the battery current Ib increases with an increase in the motor rotational speed NM, and the battery current Ib decreases with a decrease of the motor rotational speed NM.

According to the embodiment, when the fail determination is made, the target shift speed is increased and the engine speed is decreased by the charging control processing means. In addition to this, the engine speed NE may be decreased by cutting off a supply of fuel to the engine 11. For that purpose, the engine control processing means (not shown) of the engine control device 46 performs engine control processing by cutting off a supply of fuel when the fail determination is made.

Also, when the fail determination is made, the target shift speed may be increased by the shifting control processing means, and a supply of fuel may be cut off by the engine control processing means.

Note that when the fail determination is made, an upper limit of the engine speed NE is set to 4000 rpm in the first to fifth speeds.

Next, the flowchart shown in FIG. 4 will be explained. The input processing is performed in step S1. The fail determination processing is performed in step S2. The target shift speed setting processing is performed in step S3. Whether the target shift speed and the current shift speed are different is determined in step S4. When the target shift speed is different from the current shift speed, the process proceeds to step S5. When the target shift speed and the current shift speed are not different (are the same), the process proceeds on to step S6. The shifting control processing is performed in step S5. The output processing is performed in step S6, after which the routine ends.

Next, the flowchart shown in FIG. 5 will be explained. Whether the fail determination has been made is determined in step S3-1. In the case where the fail determination has been made, the process proceeds on to step S3-3. In the case where the fail determination has not been made, the process proceeds on to step S3-2. The target shift speed is calculated with reference to the normal shifting map in step S3-2, after which the routine ends. The target shift speed is calculated with reference to the fail time shifting map in step S3-3, after which the routine ends.

Next, a second embodiment according to the invention will be explained.

Figure 10:
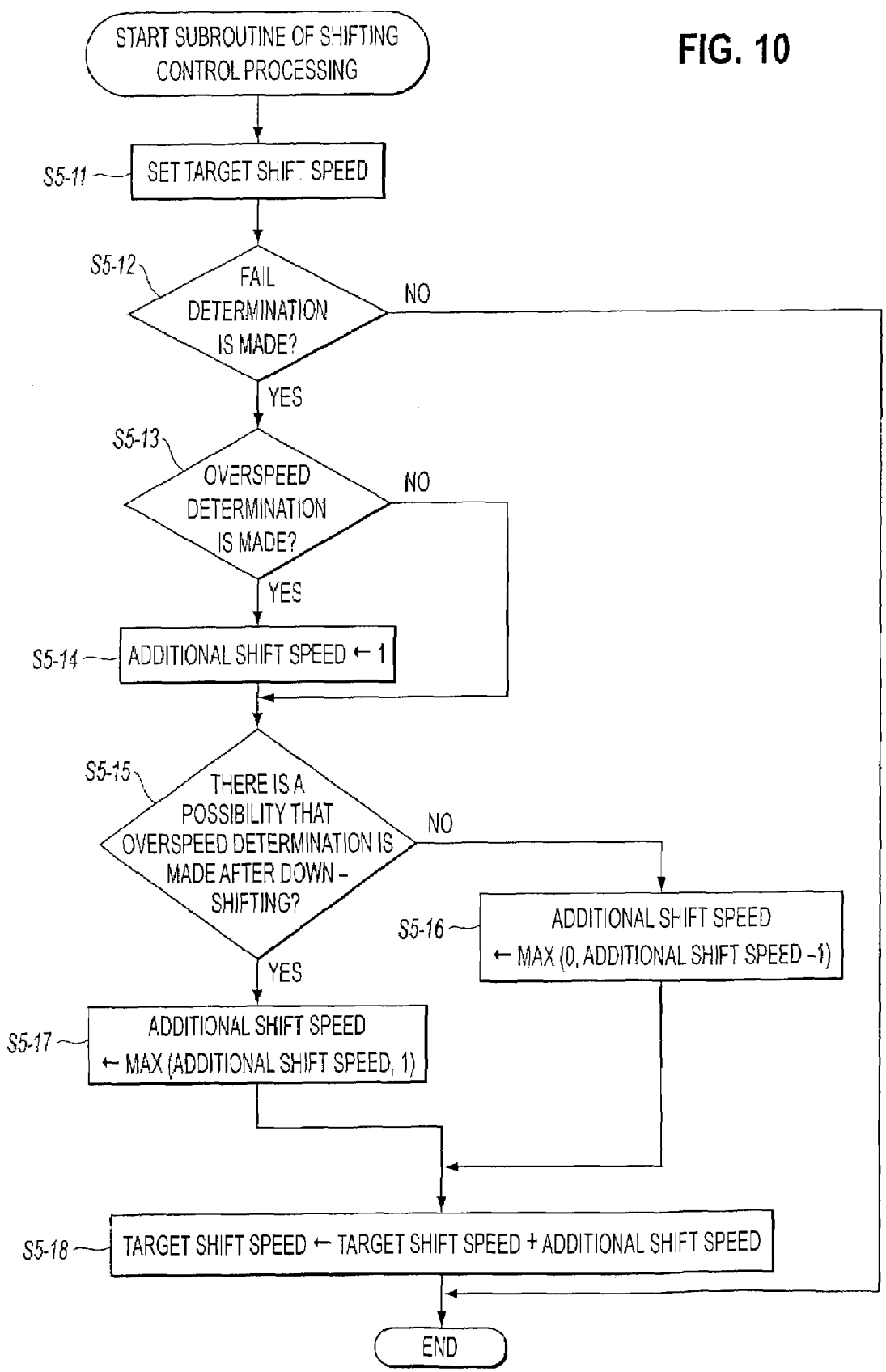
FIG. 10 is a flowchart showing a subroutine for shifting control processing according to a second embodiment of the invention.
Figure 11:
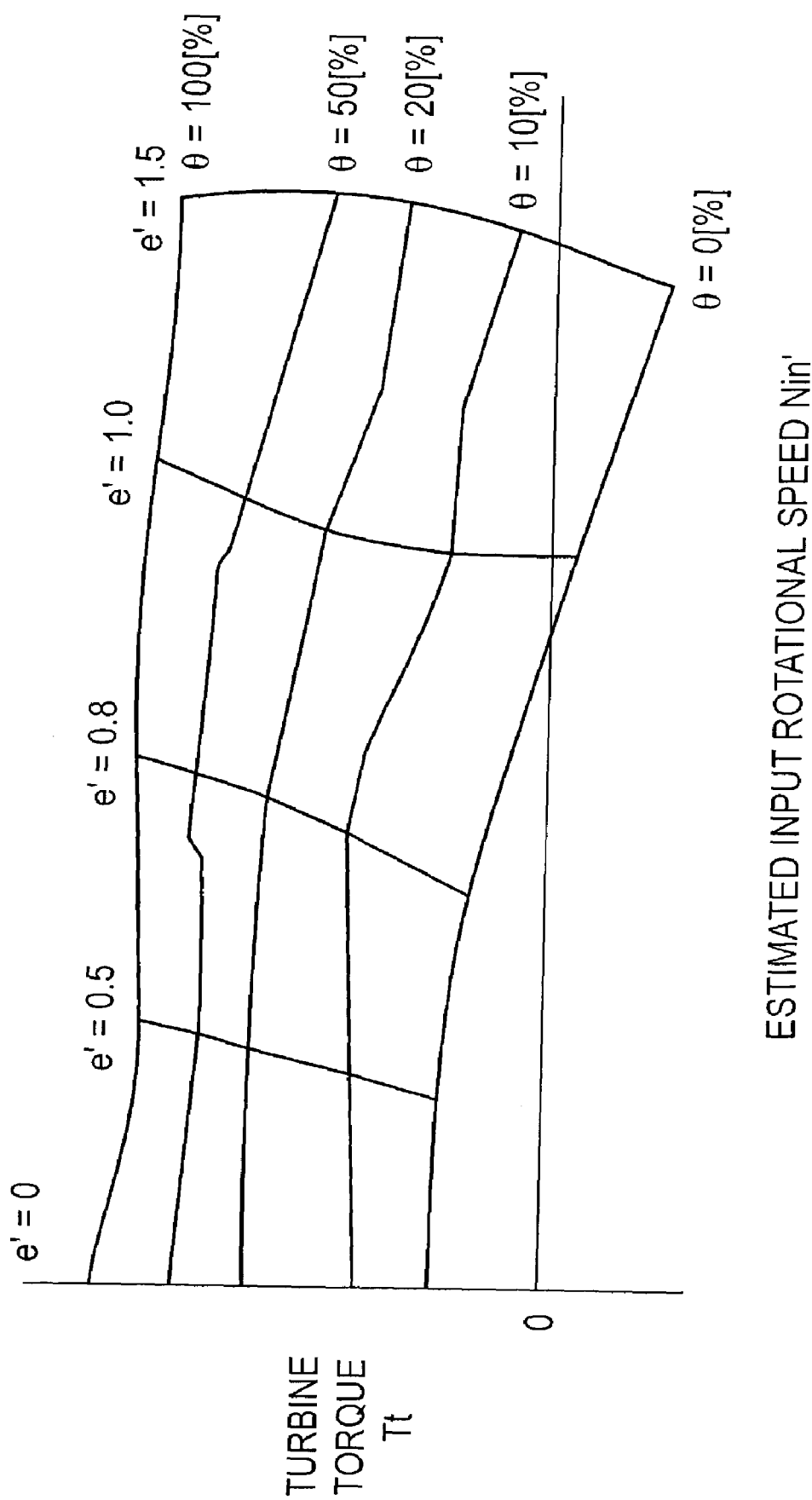
FIG. 11 is a diagram showing an estimated speed ratio according to the second embodiment of the invention.

FIG. 10 is a diagram showing a subroutine for shifting control processing according to the second embodiment of the invention. FIG. 11 is a diagram showing an estimated speed ratio map according to the second embodiment of the invention. Note that a horizontal axis shows an estimated input rotational speed Nin' and a vertical axis shows a turbine torque Tt.

In this case, the shifting control processing means (not shown) of the automatic transmission control device 52 (FIG. 3) performs shifting control processing to read the vehicle speed V and the throttle opening θ from the control device 51 for a vehicle and set a target shift speed with reference to the normal shifting map which is recorded on the recording device of the automatic transmission control device 52. Next, the shifting control processing means reads a result determined by the fail determination processing means 91 (FIG. 1), and determines whether the fail determination has been made. Then, in the case where the fail determination has been made, first overspeed determination processing means of the shifting control processing means performs the first overspeed determination processing to determine whether a failure has occurred in the motor 25.

For that purpose, the first overspeed determination processing means reads the motor rotational speed NM which is calculated in motor rotational speed calculation processing, and determines whether the motor rotational speed NM exceeds the threshold value NMfth, for example, 4000 rpm. When the motor rotational speed NM exceeds the threshold value NMfth, it is determined that a failure has occurred in the motor 25 making the overspeed determination. Alternatively, when the motor rotational speed NM is equal to or lower than the threshold value NMfth, it is determined that a failure had not occurred in the motor 25, and the overspeed determination is not made. In such a case, a value of "0" is maintained by an additional shift speed.

Next, the charging control processing means 92 of the shifting control processing means sets the additional shift speed to a value of "1" when the overspeed determination is made. Then, second overspeed determination processing means of the shifting control processing means makes a second overspeed determination processing to determine whether the overspeed determination has been made after down-shifting has been performed.

In this case, when the lock-up clutch device 23 (FIG. 2) is engaged (at the time of lock-up engagement), if a rotational speed of an output shaft of the transmission 41, that is, an output rotational speed is Nout, a gear ratio of the transmission device 41 in the target shift speed is γ, an estimated value of a rotational speed (input rotational speed) of the input shaft 19 of the transmission 41 after down-shifting is performed, that is, the estimated input rotational speed is Nin', the estimated input rotational speed Nin' is as follows:

$$Nin'=\gamma \cdot Nout$$

Accordingly, the second overspeed determination processing means reads the output rotational speed Nout which is detected by the output rotational sensor as the output rotational speed detecting portion (not shown) arranged on the output shaft of the transmission 41, and calculates the estimated input rotational speed Nin'. Next, the second overspeed determination processing means determines whether the estimated input rotational speed Nin' exceeds the threshold value NMfth. When the estimated input rotational speed Nin' exceeds the threshold value NMfth, it is determined that there is a possibility the overspeed determination is made after down-shifting is performed. Alternatively, when the estimated input rotational speed Nin' is equal to or less than the threshold value NMfth, the second overspeed determination processing means determines that there is no possibility that the overspeed determination is made after down-shifting is performed.

Meanwhile, when the lock-up clutch device 23 is not engaged (at the time of lock-up release), the second overspeed determination processing means reads the throttle opening θ which is detected by the throttle opening sensor, and calculates an estimated speed ratio e' after down-shifting is performed based on the throttle opening θ and the estimated input rotational speed Nin'. The estimated speed ratio e' is calculated as: e'=f(θ, Nin'). According to the embodiment, the second overspeed determination processing means calculates the estimated speed ratio e' by reading the estimated speed ratio e' of the torque converter 14 which corresponds to the throttle opening θ, and the estimated input rotational speed Nin' with reference to an estimated speed ratio map recorded in the automatic transmission control device 52, which is shown in FIG. 11. Note that when the estimated speed ratio e' exceeds 1, a turbine torque Tt of the torque converter 14 takes on a negative value. Alternatively, when the estimated speed ratio e' is equal to or less than 1, the turbine torque Tt of the torque converter 14 takes on a positive value. The estimated speed ratio e' shows an estimated value of a ratio (Nin/NE) of the input rotational speed Nin which is a rotational speed at an output side in the torque converter 14 to the engine speed Nin which is a rotational speed at the input side in the torque converter 14.

Then, the second overspeed determination processing means calculates an estimated engine speed NE' which shows an estimated value of the engine speed NE that is estimated after down-shifting is performed based on the estimated input rotational speed Nin' and the estimated speed ratio e'. The estimated engine speed NE' is calculated as follows;

$$NE'=NM'$$

$$=Nin'/e'$$

Note that according to the embodiment, the estimated engine speed NE' is equal to the estimated motor rotational speed NM' which shows an estimated value of the motor rotational speed NM.

Next, the second overspeed determination processing means determines whether the estimated motor rotational speed NM' exceeds the threshold value NMfth. When the estimated motor rotational speed NM' exceeds the threshold value NMfth, it is determined that there is a possibility the overspeed determination is made after down-shifting is performed. Alternatively, when the estimated motor rotational speed NM' is equal to or less than the threshold value NMfth, the second overspeed determination processing means determines that there is no possibility that the overspeed determination is made after down-shifting is performed.

When there is a possibility that the overspeed determination is made after down-shifting is performed, the charging control processing means 92 selects the maximum value from the current additional shift speed and a value of "1" as the additional shifting speed. Next, the charging control processing means 92 adds the additional shift speed to the target shift speed, and regards the added value as the target shift speed. Alternatively, when there is no possibility that the overspeed determination is made after down-shifting is performed, the charging control processing means 92 sets the maximum value among 0 and a value obtained by subtracting 1 from the current shift speed as the additional shift speed.

As mentioned above, when the motor inverter voltage VM exceeds the threshold value VMth, and the motor rotational speed NM, or the motor rotational speed NM after down-shifting is performed, exceeds the threshold value NMfth, the target shift speed is increased and the gear ratio is decreased, and the engine speed NE is decreased, an overcurrent is prevented from being supplied to the main battery 43, and the main battery 43 is prevented from being overcharged.

In addition, it is not necessary to upsize the main relay 47 as a relay on the direct cables CB1, CB2. Accordingly, not only the driving device for a vehicle can be downsized but also an arcing phenomenon can be prevented from occurring. Therefore, a period of time required until the main relay 47 is opened is reduced.

In the case where the field weakening control or the like is being performed properly, when the main battery 43 and the inverter 29 are electrically intercepted because the direct current cables CB1, CB2 are broken or connection terminals of the direct current cables CB1, CB2 are detached or the like, a voltage drop by an amount of internal resistance in the battery ceases. In this case, when the motor inverter voltage VM exceeds the threshold value VMth, and the motor rotational speed NM or the motor rotational speed NM after down-shifting is performed exceeds the threshold value NMfth, the target shift speed is increased and the gear ratio is decreased. Therefore, the engine speed NE is decreased and the motor rotational speed is decreased, which prevents an excessively high voltage from being applied to the inverter 29.

In addition, when a power transmission line for supplying power to auxiliaries of the electric vehicle, such as an electrical component, branches off from the direct current cables CB1, CB2 and is connected to the electrical component, an excessively high voltage can be prevented from being applied to the electrical component.

Next, the flowchart will be explained. The target shift speed is set in step S 5–11. Whether the fail determination has been made is determined in step S 5–12. In the case where the fail determination has been made, the process proceeds on to step 5–13. Alternatively, in the case where the fail determination has not been made, the routine ends. Whether the overspeed determination has been made is determined in step S 5–13. In the case where the overspeed determination has been made, the process proceeds on to step S 5–14, and in the case where the overspeed determination has not been made, the additional shift speed is maintained at a value of "0" and the process proceeds on to step S 5–15. The additional shift speed is set to the value of "1" in step S 5–14. Whether there is a possibility that the overspeed determination is made after down-shifting is performed is determined in step S 5–15. When there is a possibility that the overspeed determination is made after down-shifting is performed, the process proceeds on to step S 5–17. When there is no possibility that the overspeed determination is made after down-shifting is performed, the process proceeds on to step S 5–16. The maximum value among a value of "0" and a value obtained by subtracting a value of "1" from the additional shift speed is set as the additional shift speed in step S 5–16. The maximum number among the additional shift speed and 1 is set as the additional shift speed in step S 5–17. A value obtained by adding the target shift speed to the additional shift speed is set to the target shift speed, after which the routine ends.

According to the second embodiment, when the fail determination and the overspeed determination are made, the target shift speed is increased and the gear ratio is decreased. In addition to this, the target shift speed may be increased and the gear ratio may be decreased when the fail determination is not made and the overspeed determination is made.

It should be noted that the invention is not limited to the above-mentioned embodiments. Various modifications are possible based on the purpose of the invention, and the modifications shall not be excluded from the range of the invention.

What is claimed is:

1. A driving control device for an electric vehicle, comprising:

an electric machine which is driven by a current supplied from a battery;

a transmission which is drivingly coupled with the electric machine and performs shifting at a predetermined gear ratio;

a charging state detecting portion which detects an electric variable that shows a charging state of the battery;

a fail determination processing device that determines whether the electric variable exceeds a first threshold value and makes a fail determination when the electric variable exceeds the first threshold value;

a charging control processing device that decreases a rotational speed of the electric machine when the fail determination is made;

an electric machine rotational speed calculation processing device which calculates a rotational speed of the electric machine; and an overspeed determination processing device which determines whether the rotational speed of the electric machine exceeds a second threshold value and makes an overspeed determination when the rotational speed of the electric machine exceeds the second threshold value, wherein the charging control processing device decreases the rotational speed of the electric machine when the fail determination and the overspeed determination are made, and the charging control processing device decreases the rotational speed of the electric machine by decreasing the gear ratio.

2. The driving control device for an electric vehicle according to claim 1, wherein the electric machine is coupled integrally with an engine.

3. The driving control device for an electric vehicle according to claim 1, wherein the overspeed determination processing device estimates a rotational speed of the electric machine after down-shifting is performed and makes the overspeed determination when the estimated rotational speed exceeds the second threshold value.

4. The driving control device for an electric vehicle according to claim 1, wherein a hydraulic power transmission is drivingly coupled between the electric machine and the transmission, and the overspeed determination processing device estimates a rotational speed of the electric machine after down-shifting is performed on the basis of an estimated speed ratio of the hydraulic power transmission and makes the overspeed determination when the estimated rotational speed exceeds the second threshold value.

5. A driving control method for an electric vehicle including an electric machine which is drivingly driven by a current supplied from the battery, and a transmission which is coupled with the electric machine and performs shifting at a predetermined gear ratio, comprising:

determining whether an electric variable, which shows a charging state of the battery is detected, exceeds a first threshold, value;

making a fail determination when the electric variable exceeds the first threshold value;

calculating a rotational speed of the electric machine;

determining whether the rotational speed of the electric machine exceeds a second threshold value;

making an overspeed determination when the rotational speed of the electric machine exceeds the second threshold value; and decreasing the rotational speed of the electric machine when the fail determination and the overspeed determination are made, the rotational speed of the electric machine being decreased by decreasing the gear ratio.

6. The method according to claim 5, wherein the electric machine is drivingly coupled integrally with an engine.

7. The method according to claim 5, wherein the rotational speed of the electric machine is estimated after down-shifting is performed and an overspeed is determined when the estimated rotational speed exceeds the second threshold value.

8. The method according to claim 5, wherein a hydraulic power transmission is drivingly coupled between the electric machine and the transmission, and the estimation of the rotational speed of the electric machine after down-shifting is performed on the basis of an estimated speed ratio of the hydraulic power transmission and the overspeed determination is made when the estimated rotational speed exceeds the second threshold value.

9. A program of the driving control method for an electric vehicle comprising an electric machine which is driven by a current supplied from a battery, and a transmission which is drivingly coupled with the electric machine and performs shifting at a predetermined gear ratio, wherein a computer using the program functions as a charging state detecting portion which detects an electric variable that shows a charging state of the battery, and the program comprising:

a fail determination processing routine which determines whether the electric variable exceeds a threshold value and makes a fail determination when the electric variable exceeds the threshold value;

a charging control processing routine which decreases a rotational speed of the electric machine when the fail determination is made;

a rotational speed calculating routine which calculates a rotational speed of the electric machine; and an overspeed determination processing routine which determines whether the rotational speed of the electric machine exceeds a second threshold value and makes an overspeed determination when the rotational speed of the electric machine exceeds the second threshold value, wherein the charging control processing routine decreases the rotational speed of the electric machine when the fail determination and the overspeed determination are made, and the charging control processing routine decreases the rotational speed of the electric machine by decreasing the gear ratio.

\* \* \* \* \*